(12) United States Patent
Jolly et al.

(10) Patent No.: US 8,752,784 B2
(45) Date of Patent: Jun. 17, 2014

(54) AIRCRAFT ROTARY WING MOTION CONTROL AND INSTRUMENTED MOTION CONTROL FLUID DEVICE

(75) Inventors: Mark R. Jolly, Raleigh, NC (US); Zachary Fuhrer, Erie, PA (US); Robert E. Fogle, Raleigh, NC (US); David M. Catanzarite, Edinboro, PA (US)

(73) Assignee: LORD Corporation, Cary, NC (US)

( * ) Notice: Subject to any disclaimer, the term of this patent is extended or adjusted under 35 U.S.C. 154(b) by 246 days.

(21) Appl. No.: 13/439,980

(22) Filed: Apr. 5, 2012

(65) Prior Publication Data

US 2012/0256055 A1 Oct. 11, 2012

Related U.S. Application Data

(60) Provisional application No. 61/473,021, filed on Apr. 7, 2011.

(51) Int. Cl.
*B64C 27/64* (2006.01)
(52) U.S. Cl.
USPC .................. 244/17.13; 416/106; 416/140
(58) Field of Classification Search
USPC ............ 244/17.13, 17.11; 416/106, 140; 73/862; 340/447, 451
See application file for complete search history.

(56) References Cited

U.S. PATENT DOCUMENTS

| | | |
|---|---|---|
| 2,900,182 A | 8/1959 | Hinks |
| 3,269,175 A | 8/1966 | Sprosty |
| 3,616,691 A | 11/1971 | Brandau |
| 3,754,440 A | 8/1973 | Edgerton et al. |
| 3,759,631 A | 9/1973 | Rybicki |
| 3,782,854 A | 1/1974 | Rybicki |
| 3,786,413 A | 1/1974 | Ross et al. |
| 3,854,340 A | 12/1974 | Bell et al. |
| 4,105,365 A | 8/1978 | Ferris et al. |
| 4,115,755 A | 9/1978 | Cotton |
| 4,135,856 A | 1/1979 | McGuire |
| 4,203,708 A | 5/1980 | Rybicki |
| 4,215,754 A | 8/1980 | Hagedorn et al. |
| 4,237,454 A | 12/1980 | Meyer |
| 4,240,296 A | 12/1980 | Kolodziej |
| 4,312,042 A | 1/1982 | Bateman |
| 4,373,862 A | 2/1983 | Ferris et al. |
| 4,574,360 A | 3/1986 | Bateman |

(Continued)

FOREIGN PATENT DOCUMENTS

DE 1264165 B 3/1968

OTHER PUBLICATIONS

Agrawal, A.K. et al., Development of Smart Bearings System—A Feasibility Study, Project #C-02-02, 2005, 57 pgs., Dec. 2005.

(Continued)

*Primary Examiner* — Christopher P Ellis
(74) *Attorney, Agent, or Firm* — Richard G. Miller

(57) ABSTRACT

An aircraft rotary wing motion control fluid device providing motion control and with wireless sensing of at least one fluid property inside the fluid device is provided. The wireless sensing system is integrated with at least one of the first and second aircraft rotary wing motion control fluid device bodies. The wireless sensing system includes at least one fluid property sensor in sensing proximity to the at least one fluid chamber and a communications device for wirelessly conveying a measurement made by the at least one fluid property sensor to a remote location.

21 Claims, 8 Drawing Sheets

(56) References Cited

U.S. PATENT DOCUMENTS

| | | | |
|---|---|---|---|
| 4,777,829 | A | 10/1988 | Fleischman |
| 4,780,838 | A | 10/1988 | Adelson |
| 4,850,552 | A | 7/1989 | Darden et al. |
| 4,906,917 | A | 3/1990 | Olness et al. |
| 4,949,573 | A | 8/1990 | Wolfe et al. |
| 5,090,248 | A | 2/1992 | Cimmino et al. |
| 5,229,956 | A | 7/1993 | Daniel et al. |
| 5,300,875 | A | 4/1994 | Tuttle |
| 5,349,537 | A | 9/1994 | Burger et al. |
| 5,381,692 | A | 1/1995 | Winslow et al. |
| 5,390,949 | A | 2/1995 | Naganathan et al. |
| 5,570,286 | A | 10/1996 | Margolis |
| 5,732,905 | A * | 3/1998 | Krysinski ............ 244/17.27 |
| 5,741,966 | A | 4/1998 | Handfield et al. |
| 5,853,020 | A | 12/1998 | Widner |
| 5,905,212 | A | 5/1999 | Moses et al. |
| 5,908,485 | A | 6/1999 | Germanetti |
| 5,915,273 | A | 6/1999 | Germanetti |
| 5,987,397 | A | 11/1999 | McCool et al. |
| 6,004,099 | A | 12/1999 | Bansemir et al. |
| 6,076,405 | A | 6/2000 | Schoess |
| 6,243,007 | B1 | 6/2001 | McLaughlin et al. |
| 6,273,613 | B1 | 8/2001 | O'Brien et al. |
| 6,370,482 | B1 | 4/2002 | Wirth |
| 6,400,282 | B1 | 6/2002 | Germanetti |
| 6,433,629 | B2 | 8/2002 | Hamel et al. |
| 6,550,346 | B2 | 4/2003 | Gombert et al. |
| 6,676,074 | B2 * | 1/2004 | Zoppitelli et al. ......... 244/17.11 |
| 6,693,548 | B2 | 2/2004 | Boyce et al. |
| 6,714,135 | B2 | 3/2004 | Froman et al. |
| 6,845,672 | B2 | 1/2005 | Mol et al. |
| 7,035,070 | B2 | 4/2006 | Shiner et al. |
| 7,081,693 | B2 | 7/2006 | Hamel et al. |
| 7,170,201 | B2 | 1/2007 | Hamel et al. |
| 7,276,703 | B2 | 10/2007 | Berkcan et al. |
| 7,296,006 | B2 | 11/2007 | Flynn et al. |
| 7,345,372 | B2 | 3/2008 | Roberts et al. |
| 7,361,998 | B2 | 4/2008 | Hamel et al. |
| 7,365,455 | B2 | 4/2008 | Hamel et al. |
| 7,429,805 | B2 | 9/2008 | Hamel et al. |
| 7,558,701 | B2 | 7/2009 | Andarawis et al. |
| 7,571,058 | B2 | 8/2009 | Sealing et al. |
| 7,624,080 | B1 | 11/2009 | Morales et al. |
| 7,668,667 | B2 | 2/2010 | Robb et al. |
| 7,680,630 | B2 | 3/2010 | Schmidt |
| 7,719,416 | B2 | 5/2010 | Arms et al. |
| 7,838,782 | B2 | 11/2010 | Hamilton et al. |
| 7,860,664 | B2 | 12/2010 | Loomis et al. |
| 8,382,028 | B2 * | 2/2013 | Jolly .......................... 244/17.13 |
| 2003/0012650 | A1 * | 1/2003 | Ferullo .......................... 416/106 |
| 2003/0146343 | A1 | 8/2003 | Zoppitelli |
| 2009/0324407 | A1 * | 12/2009 | Manfredotti et al. ............. 416/1 |
| 2010/0164711 | A1 | 7/2010 | Arms et al. |
| 2010/0247288 | A1 | 9/2010 | Russell |
| 2011/0052395 | A1 | 3/2011 | Louis et al. |

OTHER PUBLICATIONS

Algera, D. et al., Rotary Wing Structural Life Tracking Architecture, American Helicopter Society 66th Annual Forum, Phoenix, AZ, 10 pgs., May 11-13, 2010.

Andrews, James R. et al., Advanced CBM Technologies for Helicopter Rotor Systems—Full Scale Rotor Demonstration and Test Results, American Helicopter Society 66th Annual Forum, Phoenix, AZ, 12 pgs., May 11-13, 2010.

Arms, S.W. et al., Calculating Fatigue Damage with Wireless Sensors: Duty Cycling vs. Down Sampling, 7 pgs.

Arms, Steven W. et al., Energy Harvesting Wireless Sensors for Helicopter Damage Tracking, Proceedings of AHS International Forum 62, HUMS III session, Phoenix, AZ, 6 pgs., May 11, 2006.

Azzam, Hesham et al., Modal testing and Machine Learning Techniques for Structural Health Monitoring, 12 pgs.

Baker, Treven et al., Operations Support and Sustainment Technology Program, Providing Technology for Condition Based Maintenance, 20 pgs.

Bonev, Ilian, The True Origins of Parallel Robots, http://www.parallelmic.org/Reviews/Review007.html, 8 pgs., Feb. 28, 2011.

Cassidy, Karen, Qualifying an On-Line Diagnostic and Prognostic Sensor for Fixed and Rotary Wing Bearings and Gears, IEEE Aerospace Conference, 25 pgs., Mar. 2008.

Civil Aviation Authority, HUMS Extension to Rotor Health Monitoring, CAA Paper May. 2008, 126 pgs., Mar. 2009.

Colibrys, Smart Sensing Solutions, http://www.colibrys.com, 6 pgs., Nov. 23, 2010.

CSERE, CSABA, Continental Evolves the Tire-Pressure Sensor—Tech Dept. Harder-working sensors yield safety and performance benefits, 5 pgs., Sep. 2010.

Dapino, Marcelo J. et al., A Magnetoelastic Model for Villari-Effect Magnetostrictive Sensors, 17 pgs.

Drummond, Katie, Cracking the Code for Crystal-Powered Super Spooks, Danger Room, 7 pgs., Mar. 1, 2010.

Ganguli, Ranjan et al., Formulation of a Helicopter Rotor System Damage Detection Methodology, American Helicopter Society, vol. 41, No. 4, 12 pgs., Oct. 1996.

IEEE, Setting HUMS Condition Indicator Thresholds by Modeling Aircraft and Torque Band Variance, IEEE Aerospace Conference Proceedings, 6 pgs., 2004.

Iyyer, N. et al., Architecture for Dynamic Component Life Tracking in an Advanced HUMS, RFID, and Direct Load Sensor Environment, 24 pgs.

KCF Technologies, Inc., Ultra-Compact Power Harvesting for Self-Powered Aircraft Sensors, 4 pgs.

Kwun, Dr. Hegeon, Back in Style: Magnetostrictive Sensors, 7 pgs.

Kinetic Watch Shop.Com, Q and A, 4 pgs., 2000-2005.

Loverich, Jacob, Rotary Wing Dynamic Component Structural Life Tracking with Self-Powered Wireless Sensors, American Helicopter Society International, Inc., 8 pgs., 2010.

Loverich, Jacob, Energy Harvester Powered Wireless Accelerometers, American Helicopter Society International, Inc., 11 pgs., May 3-5, 2011.

Maurer Sohne, Bridge Bearings with Load Measuring Capability, 4 pgs., Feb. 2001.

McColl, Chance et al, Comprehensive UH-60 Loads Model Validation, 13 pgs.

Microstrain, DVRT Microminiature Displacement Sensors, www.microstrain.com, 1 pg., 2009.

Motorola et al., Motorola's MPXY8000 Series Tire Pressure Monitoring Sensors, 22 pgs., May 2003.

Mtenga, Primus V., Elastomeric Bearing Pads Under Combined Loading, Contract No. BC352-16, 110 pgs., Mar. 2007.

Nevill, A.J. et al, In-she foot pressure measurement system utilizing piezoelectric film transducers, Medical & Biological Engineering & computing, 1 pg., Jan. 1995.

Ottman, Geffrey K. et al., Optimized Piezoelectric Energy Harvesting Circuit Using Step-Down Converter in Discontinuous Conduction Mode, IEEE Transactions on Power Electronics, vol. 18, No. 2, 8 pgs., Mar. 2003.

Pawar, P.M. et al., Helicopter rotor health monitoring—a review, Proc. IMechE., vol. 221, part G, Aerospace Engineering, 17 pgs., 2007.

Potter, J.L., Lord Corporation, Aerospace Products Division, Recent Advancement in Elastomeric Products for Improving Helicopter Reliability and Maintainability, 24 pgs., 1978.

Shanthakumaran, P. et al., Usage Based Fatigue Damage Calculation for AH-64 Apache Dynamic Components, American Helicopter Society 66th Annual Forum, Phoenix, AZ,17 pgs., May 11-13, 2010.

Spencer, B.F. et al., Smart Sensing Technology: Opportunities and Challenges, 31 pgs.

Stmicroelectronics NV, LSM303DLH Sensor Module: 3-axis accelerometer and 3-axis magnetometer, 48 pgs., 2009.

Lewis, F.L., The University of Texas Arlington, Distributed Intelligence & Autonomy Lab, Automation & Robotics Research Institute (ARRI), Wireless Sensor Networks Applications in UAV Helicopters and Intelligent Diagnosis, http://ARRI.uta.edu/acs, 42 pgs.

(56) References Cited

OTHER PUBLICATIONS

U.S. Department of Energy, Industrial Technologies Program, Low-Cost Vibration Power Harvesting for Wireless Sensors, Vibration power empowers wireless networks to boost industrial productivity, 2 pgs., Jul. 2008.
Welcome to Vibrationdata, Acoustics Shock Vibration Signal Processing, 12 pgs., Aug. 2004 Newsletter.
Wang, Zhihao et al, Self-powered and sensing control system based on MR damper: presentation and application, 10 pgs.
Waukesha Bearings, System Details, http://waukbearing.com/en-US/systems/system-details/, 1 pg., Feb. 23, 2011.
Wilcoxon Research, Vibralink Products and System Integration, www.wilcoxon.com, 10 pgs.
Wilcoxon, Research, Helicopter Sensors, Application Solution, www.wilcoxon.com, 3 pgs.
Wikipedia, Wireless energy transfer, 17 pgs.
Wright, Johnny, Emerging Results Using IMD-HUMS in a Black Hawk Assault Battalion, 18 pgs.
Yang, Mao et al., Vibration Prediction for Rotor System with Faults Using Coupled Rotor-Fuselage Model, Journal of Aircraft, vol. 41, No. 2, 11 pgs., Mar.-Apr. 2004.
Zakrajsek, James J. et al., NASA, Rotorcraft Health Management Issues and Challenges, TM-2006-214002, http://ww.gltrsigrc.nasa.gov, 18 pgs., Feb. 2006.

* cited by examiner

AIRCRAFT ROTARY WING MOTION CONTROL AND INSTRUMENTED MOTION CONTROL FLUID DEVICE

This application claims the benefit of U.S. Provisional Application 61/473,021, filed Apr. 7, 2011, entitled "AIRCRAFT ROTARY WING MOTION CONTROL AND INSTRUMENTED MOTION CONTROL FLUID DEVICE", which is herein incorporated by reference.

BACKGROUND

The invention relates generally to motion control fluid devices and monitoring of fluid properties in motion control fluid devices.

Motion control fluid devices that are of interest here are those that are configured to be attached between two structures, such as aircraft rotary wing members, in order to control relative motion between the two structures. Such a motion control fluid device includes at least one chamber containing a fluid. The motion control fluid device may also include at least one elastomer bonded to two surfaces subjected to relative motion. The motion control fluid device generates a motion force, via controlled motion of the fluid within the at least one chamber (and constrained motion of the at least one elastomer, if present), when a disturbance, such as vibrations from an attached structure, is applied to the motion control fluid device. Depending on the configuration of the motion control fluid device, the motion control force may be used to damp down the applied disturbance or to isolate the applied disturbance. In some cases, the motion control fluid device may include a volume compensator to maintain a steady pressure within the device and thereby avoid abnormally high or low pressures within the device. The health of such devices can be assessed by monitoring fluid properties, such as pressure, in the devices.

SUMMARY

In one aspect, a fluid device providing aircraft rotary wing motion control and controlling the relative motion between a first aircraft rotary wing member and a second aircraft is provided. The fluid device comprises a first fluid device body, a second fluid device body, at least one fluid chamber, at least one elastomer, and a wireless sensing system. The second fluid device body is movably coupled to the first fluid device body, wherein the first fluid device body and the second fluid device body each have an opposing surface therebetween. There is at least one fluid chamber inside one of the first and second fluid device bodies. The at least one elastomer bonded is between the opposing surfaces of the first and second fluid device bodies. The wireless sensing system is integrated with at least one of the first and second fluid device bodies, the wireless sensing system including at least one fluid property sensor in sensing proximity to the fluid chamber and a communications device for wirelessly conveying a measurement made by the fluid property sensor to a remote location.

In another aspect, an instrumented motion control fluid device for providing a controlled relative motion between two structures is provide. The instrumented motion control fluid device comprises a first fluid device body, a second fluid device body, at least one fluid chamber, at least one elastomer, and a wireless sensing system. The second fluid device body is movably coupled to the first motion control fluid device body. There is at least one fluid chamber defined inside one of the first fluid device body and the second fluid device body. There is a wireless sensing system integrated with at least one of the first fluid device body and the second fluid device body, the wireless sensing system includes at least one fluid property sensor in sensing proximity to the fluid chamber and a communications device for wirelessly conveying a measurement made by the fluid property sensor to a remote location.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1A:
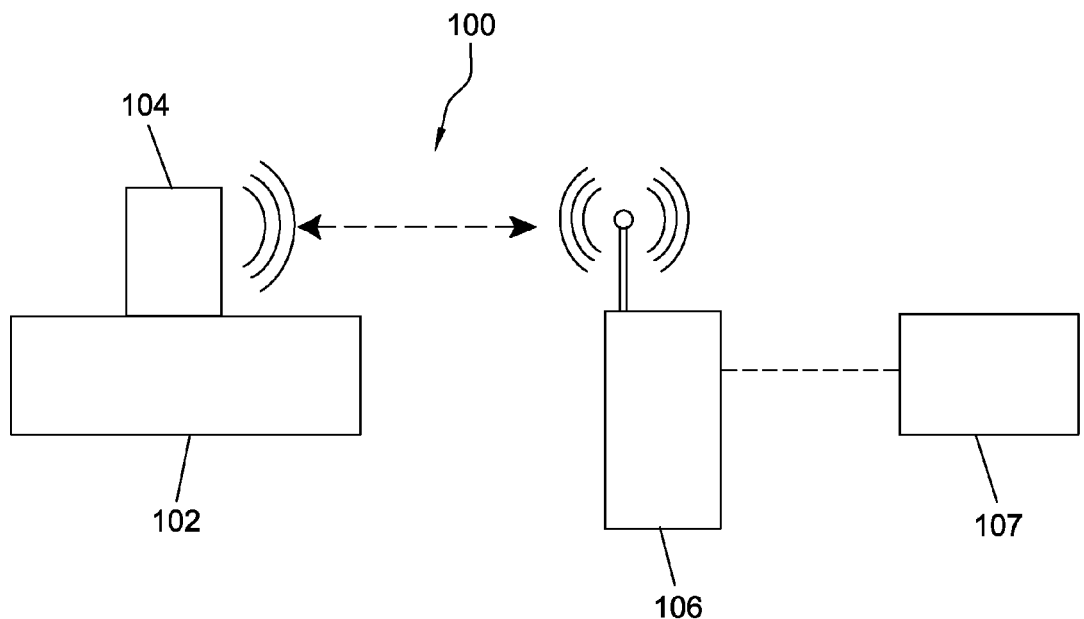
FIG. 1A illustrates a block diagram of a wireless sensing system for a motion control fluid device.

FIG. 1A shows a block diagram of a system 100 for monitoring the health of a motion control fluid device before and/or after the motion control fluid device is attached to a host, such as an aircraft. The motion control fluid device is instrumented to enable its health to be monitored. The motion control fluid device includes at least one motion control fluid device chamber 102 containing a fluid, which may be a liquid or gas, and a wireless sensing system 104. The wireless sensing system 104 includes at least one fluid property sensor 105a in sensing proximity to the at least one motion control fluid device chamber 102. The term "sensing proximity" means that the at least one fluid property sensor 105a is installed where it can measure a fluid property within the at least one motion control device chamber 102, i.e., there is a fluid communication path between the fluid property sensor 105a and the fluid chamber. Preferably, the wireless sensing system 104 includes at least a pressure sensor and optionally a temperature sensor. The system 100 includes a wireless reader 106 at a remote location for collecting and storing data from the wireless sensing system 104. Here, "remote" may be a few feet or several feet from the wireless sensing system 104 depending on the reading range of the wireless sensing system 104. The wireless reader 106 may be implemented as a handheld device or as a mounted device. The wireless reader 106 may be a standalone device or may be coupled to a controller system 107. If the instrumented motion control fluid device is attached to an aircraft, for example, then the onboard control system of the aircraft could serve as the controller system 107.

Figure 1B:
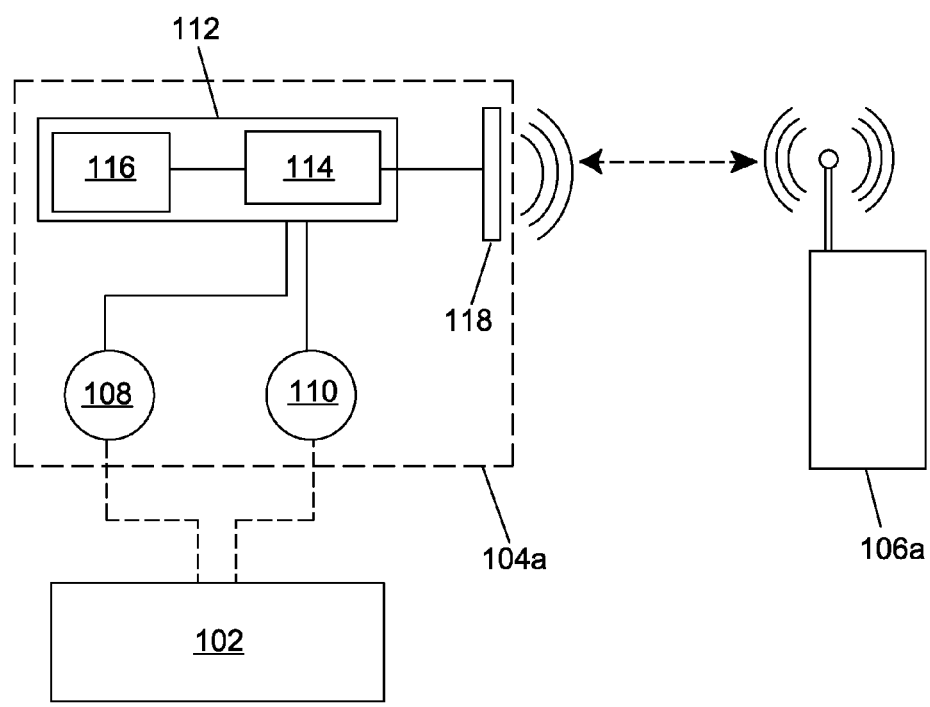
FIG. 1B illustrates a block diagram of a passive wireless sensing system for a motion control fluid device.

FIG. 1B shows a wireless sensing system 104a as an embodiment of the wireless sensing system 104 of FIG. 1A. The wireless sensing system 104a includes at least one fluid property sensor 105a, e.g., a pressure sensor 108 and a temperature sensor 110, for measuring at least one fluid property in the motion control fluid device chamber 102. The wireless sensing system 104 further includes a microcontroller 112 for controlling operation of the wireless sensing system 104. The microcontroller 112 has a processor 114 and memory 116. The microcontroller 112 also has input and output ports that are not specifically shown. The processor 114 can be configured to process logic for conditioning signals from the sensors 108, 110, logic for retrieving data from the memory 116, and logic for wireless communication. The memory 116 may include a unique identifier for identifying the wireless sensing system 104a and may be used for storing data related to operation of the wireless sensing system 104a. The sensors 108, 110 are coupled to the microcontroller 112. The wireless sensing system 104a includes an antenna 118 for wireless communication with the reader 106. The antenna 118 is coupled to the microcontroller 112.

The wireless sensing system 104a is of the passive type. In this case, a reader 106a, corresponding to the reader 106 in FIG. 1A, powers the wireless sensing system 104a by sending electromagnetic waves to the antenna 118. When the antenna 118 receives the electromagnetic waves, electrical energy is induced in the microcontroller 112 that energizes the microcontroller 112. The microcontroller 112 may in turn provide power to the sensors 108, 110. The wireless sensing system 104a also uses the antenna 118 to send information stored in the memory 116 and measurements made by the sensors 108, 110 to the reader 106a. The information stored in the memory 116 will typically include fixed data, such as the unique identifier for the wireless sensing system 104a and calibration constants. The reading range of such a passive device is short, typically a few feet. Preferably, the antenna 118 communicates with the reader 106a using a low-power wireless communications protocol, such as one based on the IEEE 802.15.4 standard (for low-rate wireless personal area networks) or IEEE 802.15.1 standard (for Bluetooth devices). In one embodiment, a RFID protocol based on the IEEE 802.15.4 standard is used for the low-power wireless communication between the reader 106a and the antenna 118.

The wireless sensing system 104a may be provided in a single device body to be mounted at a single location in the motion control fluid device or in multiple device bodies to be mounted at multiple locations in the motion control fluid device. In the latter case, appropriate connections would need to be made between the wireless sensing system components in the multiple device bodies. Regardless of whether the wireless sensing system 104 is provided in a single device body or multiple device bodies, the sensing part of the wireless sensing system 104a (i.e., sensors 108, 110) would need to be in sensing proximity to the at least one motion control fluid device 102. Preferably, each device body is made of a material suitable for the environment in which the instrumented motion control fluid device would be used. Any device body containing the antenna 118 should be permeable to electromagnetic waves so that the reader 106a can communicate with the wireless sensing system 104a. The shape of each device body may be selected based on where the device body will be integrated into the motion control fluid device. Examples of suitable device body shapes are cylindrical, tubular, curved, and flat.

Figure 1C:
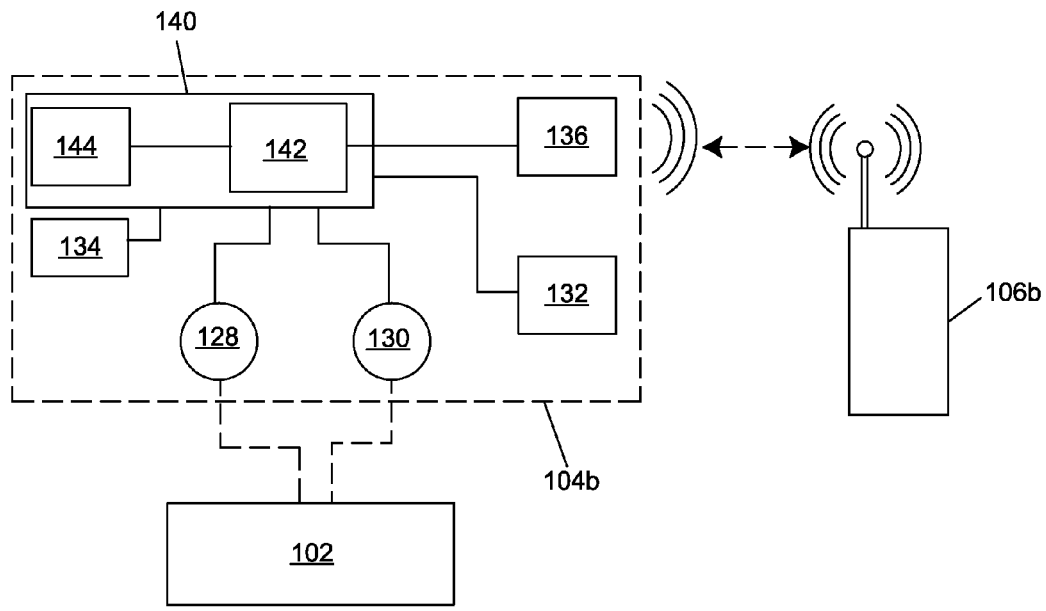
FIG. 1C illustrates a block diagram of an active wireless sensing system for a motion control fluid device powered by an energy storage device.

FIG. 1C shows a wireless sensing system 104b as another embodiment of the wireless sensing system 104 of FIG. 1A. The wireless sensing system 104b includes at least one fluid property sensor 105b, e.g., a pressure sensor 128 and a temperature sensor 130, for measuring at least one fluid property in the motion control fluid device chamber 102. The wireless sensing system 104b further includes a microcontroller 140 for controlling operation of the wireless sensing system 104b. The microcontroller 140 has a processor 142 and memory 144. The microcontroller 142 also has input and output ports that are not specifically shown. The processor 142 can be configured to process logic for conditioning signals from the sensors 128, 130, logic for storing data in and retrieving data from the memory 144, and logic for wireless communication. The memory 144 may include a unique identifier for identifying the wireless sensing system 104b and may be used for storing data related to operation of the wireless sensing system 104b. The sensors 128, 130 are coupled to the microcontroller 140. The wireless sensing system 104b may include a display 134, which may be coupled to the microcontroller 140. The processor 142 may also be configured to process logic for displaying information—such as status of the wireless sensing system 104b or data collected by the sensors 128, 130 or other information related to operation of the wireless sensing system 104b on the optional display 134.

The wireless sensing system 104b includes a transceiver 136 for communication in at least one direction with a reader 106b, which corresponds to the reader 106 in FIG. 1A. The wireless sensing system 104b sends sensor measurements to the reader 106b via the transceiver 136 and receives instructions from the reader 106b via the transceiver 136. The data the wireless sensing system 104b sends to the reader 106b includes measurements made by the sensors 128, 130 and may include the unique identifier stored in the memory 144. The sensor measurements may or may not be sent in real-time. The transmitted data can include timestamps to indicate when the sensor measurements were made. The transceiver 136 may communicate with the reader 106b using any suitable low-power two-way active wireless protocol, such as one based on the IEEE 802.15.4 standard or one based on IEEE 802.15.1 or one based on IEEE 1902.1 standard. As an example, active RFID, ZigBee®, or Bluetooth® protocol may be used. The wireless sensing system 104b is of the active type. It includes an energy storage device 132 for powering the microcontroller 140, which may in turn provide power to the transceiver 136 and sensors 128, 130. Energy storage device 132 may be a battery. A continuous power supply would allow the wireless sensing system 104b to operate autonomously and continuously. The wireless sensing system 104b may measure one or more fluid properties in the motion control fluid device chamber 102 autonomously or as demanded by a controller system, such as controller system 107 in FIG. 1A, where the controller system communicates with the wireless sensing system 104b through the reader 106b. The controller system may perform one or more actions based on the data received from the wireless sensing system 104b.

The wireless sensing system 104b may have a sleep mode in which it does not make measurements. It may periodically exit the sleep mode to make measurements, or it may exit the sleep mode to make measurements when it receives a command to do so from a controller system, such as controller system 107 (in FIG. 1A). Use of the sleep mode together with low-power wireless communication can extend the life of the energy storage device 132. Preferably, the wireless sensing system 104b is configured and integrated with the motion control fluid device such that it is easy to replace the energy storage device 132 without leaking fluid or pressure from any of the chambers within the motion control fluid device. The reading range of the wireless sensing system 104b should be longer than that of the passive wireless sensing system 104a described in FIG. 1B. This would allow more flexibility in where the reader 106b can be placed in order to communicate with the wireless sensing system 104b. The wireless sensing system 104b may be provided in a single device body to be mounted at a single location in the motion control fluid device or in multiple device bodies to be mounted at multiple locations in the motion control fluid device as described above for the wireless sensing system 104a (in FIG. 1B).

Figure 1D:
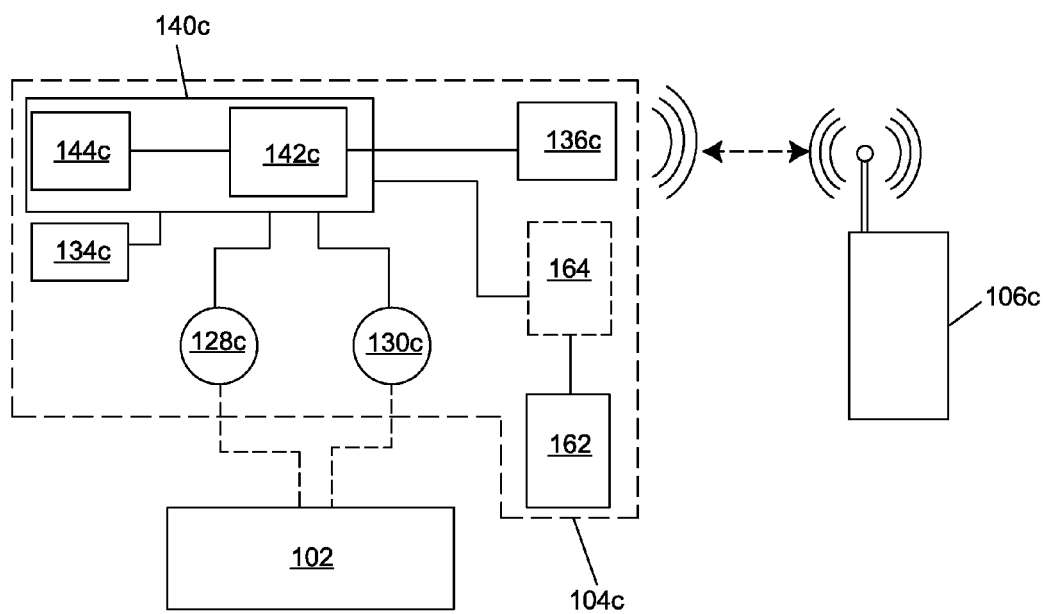
FIG. 1D illustrates a block diagram of another active wireless sensing system for a motion control fluid device powered by energy harvesting.

FIG. 1D shows a wireless sensing system 104c as another embodiment of the wireless sensing system 104 of FIG. 1A. The wireless sensing system 104c shares many of the features of the wireless sensing system 104b, such as sensors 128c, 130c, microcontroller 140c including processor 144c and memory 142c, optional display 134c, and transceiver 136c. An energy harvester 162 is coupled to the microcontroller 140c to provide power to the microcontroller 140c. The energy harvester 162 harvests energy from the environment in which it is located and may take on various forms. In one embodiment, the energy harvester 162 is a thermal energy harvester that converts unused heat to usable electrical energy. Without limitations, one example of a suitable thermal energy harvester is Flexible Thermoelectric Film (FTF) from Perpetua Power Source Technologies, Inc. in Oregon, USA. The FTF energy harvester is based on the Seebeck effect and includes thermoelectric generators that convert temperature differences across dissimilar materials into electrical potential or voltage. When the FTF energy harvester is connected to a device, such as the microcontroller 140c, this voltage difference will cause current flow and delivery of renewable power to the device. Another example of a thermal energy harvester is a Peltier thermal energy harvester. In another embodiment, the energy harvester 162 is a vibration energy harvester that converts unused mechanical vibration into usable electrical energy. Suitable vibration energy harvesters are available from Perpetuum Ltd in Southampton, UK. In another embodiment, the energy harvester 162 is a strain energy harvester.

The wireless sensing system 104c functions in the same manner described above for the wireless sensing system 104b (in FIG. 1C), except that the power to operate the wireless sensing system 104c is provided by energy harvesting. The energy harvester 162 may power the microcontroller 140c directly or may store the harvested energy in a power storage device 164, which would then provide power to the microcontroller 140c, where the microcontroller 140c can then distribute power to the other components of the wireless sensing system 104c as needed. The power storage device 164 may be in the form of a capacitor, a super capacitor, or a chemical battery. Typically, the wireless sensing system 104c will be provided in multiple device bodies to be mounted at multiple locations in the motion control fluid device. This is because the sensing part of the wireless sensing system 104c (e.g., sensors 128c, 130c) needs to be where it can measure one or more fluid properties in the at least one motion control fluid device chamber 102, while the energy harvester 162 needs to be where it can harvest the type of environmental energy it is configured to harvest.

Figure 2A:
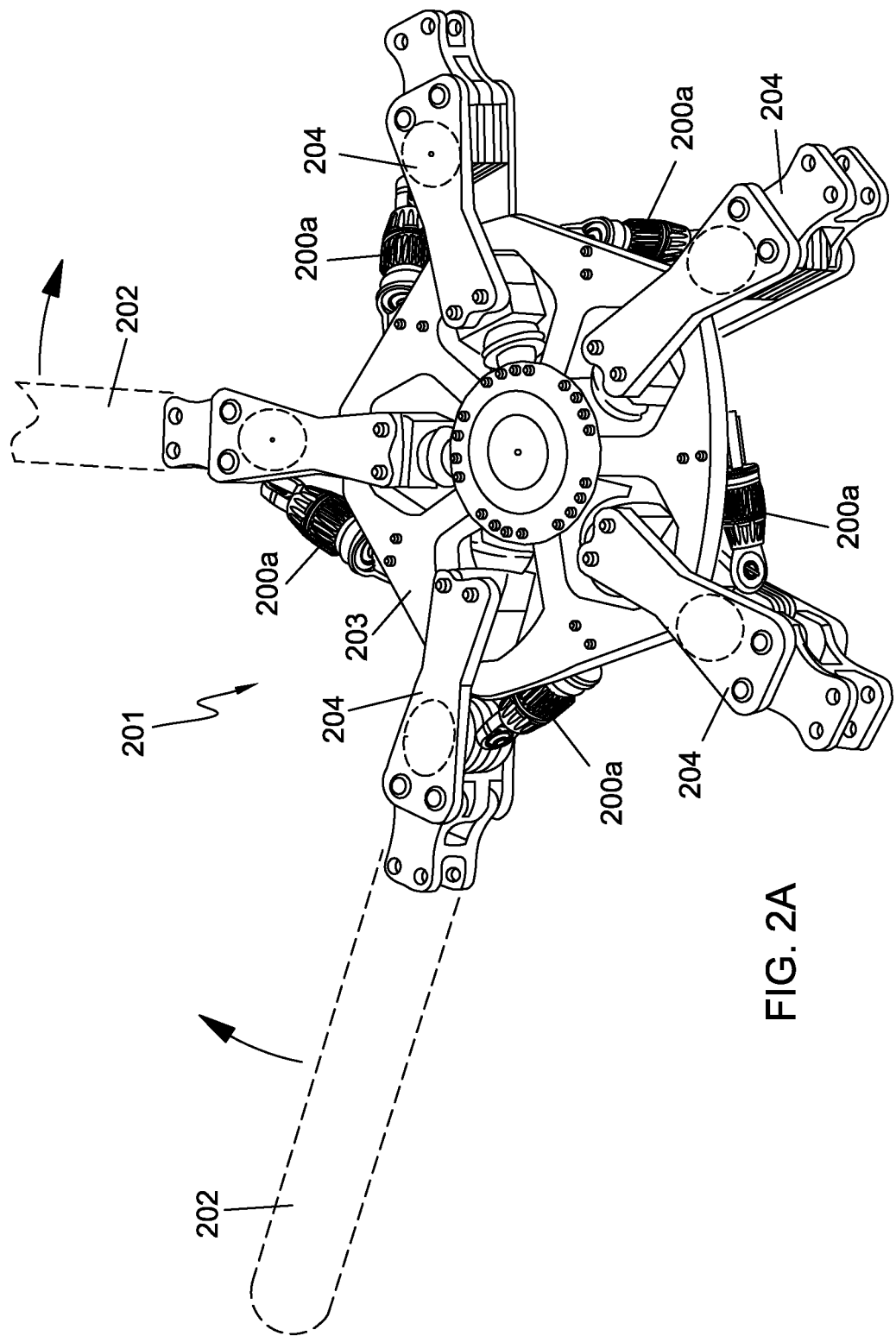
FIG. 2A illustrates a three-dimensional view of an aircraft rotary wing system incorporating instrumented dampers.

FIG. 2A shows a plurality of instrumented dampers 200a, which are a type of motion control fluid device, attached to an aircraft rotary wing system 201 to control vibrations of rotating blades 202. The rotary wing system 201 has a hub 203. The rotating blades 202 are coupled to the hub 203 by linkages 204. Each of the dampers 200a has one end coupled to one of the linkages 204 and another end coupled to the hub 203. By this arrangement, disturbances in the rotating blades 202 during rotation of the rotating blades 202 are transferred to the dampers 200a. The dampers 200a will dampen the vibrations so that the hub 203 sees little to no vibrations from the rotating blades 202.

Figure 2B:
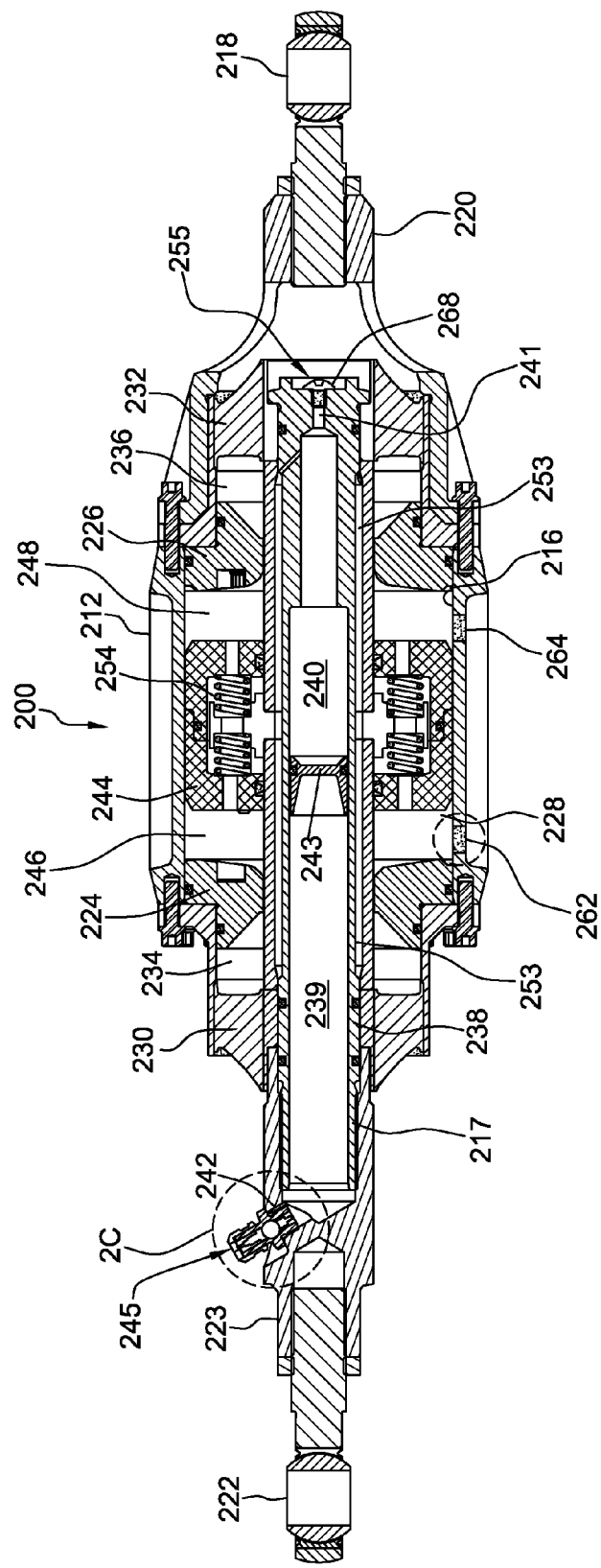
FIG. 2B illustrates a cross-sectional view of an instrumented damper.

FIG. 2B shows an instrumented damper 200, which may serve as any one of the dampers 200a in FIG. 2A. The damper 200 has an outer damper body 212 and an inner damper body 214. Outer damper body 212 is also known as first fluid device body 212. Inner damper body 214 is also known as second fluid device body 214. The inner damper body 214 is received partially within the outer damper body internal cavity 216 of the outer damper body 212. The inner damper body 214 is supported for axial motion within the outer damper body internal cavity 216 and relative to the outer damper body 212 by guide bushings 224, 226. A piston 244 is arranged between the outer damper body 212 and the inner damper body 214. Inner damper body 214, or second fluid device body 214, is movably coupled to outer damper body 212, or first fluid device body 212, wherein outer damper body 212, or first fluid device body 212, and inner damper body 214, or second fluid device body 214, each have an opposing surface therebetween.

A working fluid chamber 246 is created on one side of the piston 244, and another working fluid chamber 248 is created on another side of the piston 244. The volumes of the chambers 246, 248 can change by axial motion of the piston 244 relative to the outer damper body 212. The working fluid chambers 246, 248 are filled with damping fluid, such as liquid silicone. A flow path runs through the piston 244 for pumping damping fluid between the working fluid chambers 246, 248, where the damping force provided by the damper 200 is related to the amount of fluid pumped through the flow path. In one embodiment, the damper 200 is a lead-lag damper and achieves lead-lag damping through a spring connection between the inner damper body 214 and the piston 244. Preferably, the spring connection includes at least one spring element 254 arranged serially between the inner damper body 214 and the piston 244, where the term "arranged serially" preferably means that the piston 244 can move relative to the inner damper body 214 through deformation of the at least one spring element 254.

The damper 200 includes one or more elastomer rings, such as elastomeric rings 230, 232 arranged at or near distal ends of the outer damper body internal cavity 216. The elastomeric rings 230, 232 engage the outer damper body 212 and the inner damper body 214 and provide seals between the outer damper body 212 and inner damper body 214. The elastomeric rings 230, 232 are preferably attached, bonded, or otherwise fixed, to the outer damper body 212 and the inner damper body 214 so that they provide non-sliding seals between the outer damper body 212 and inner damper body 214. Auxiliary Fluid Chambers 234, 236 are located adjacent to the elastomeric rings 230, 232, respectively. The volumes of the auxiliary fluid chambers 234, 236 change when the elastomeric rings 230, 232 are sheared as a result of the inner damper body 214 moving relative to the outer damper body 212. The auxiliary fluid chambers 234, 236 are each filled with damping fluid. Backfill ports(s) and valve(s), not identified separately, may permit fluid flow from the auxiliary fluid chambers 234, 236 to the working fluid chamber 228. The backfill port(s) and valve(s) may be configured to prevent dynamic fluid flow from the working fluid chambers 246, 248 to the auxiliary fluid chambers 234, 236 so that the elastomeric rings 230, 232 are isolated from dynamic pressures inside the working fluid chambers 246, 248.

The damper 200 also includes a volume compensator 238 in an internal chamber 217 of the inner damper body 214. In an embodiment, the volume compensator 238 includes a fluid chamber 239 and a fluid chamber 240. The fluid chambers 239, 240 may be separated by a movable barrier 243. The fluid chamber 239 is connected to a port 242 in the inner damping body 214 and can be charged with a gas, such as nitrogen, through a charging valve 245 in the port 242. The fluid chamber 240 is connected to the auxiliary fluid chambers 234, 236 via fluid channels 253. A port 241 at the end of the volume compensator 238 is used to fill spaces in the damper 200 not occupied by solid structures with damping fluid. All the chambers mentioned above, except for the fluid chamber 239 charged with gas, are filled with the damping fluid. A plug 255 is used to seal the port 241 to contain the damping fluid inside the damper 200. The damping fluid within the damper 200 expands and contracts as the damper 200 heats up and cools down, respectively, during use. The gas in the fluid chamber 239 of the volume compensator 238 is compressible to allow for the expansion and contraction of the damping fluid. The volume compensator 38 allows a steady pressure to be applied to the damping fluid so that cavitation of the damping fluid or excess pressure buildup within the damper 200 is avoided.

Figure 2C:
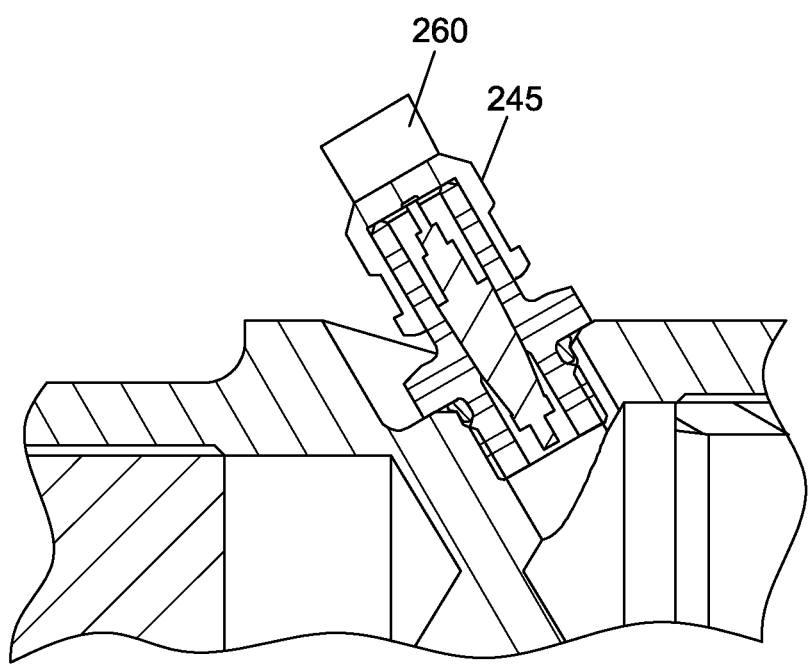
FIG. 2C illustrates an enlarged portion of the instrumented damper of FIG. 2B.

The instrumentation of the damper 200 comes from integrating a wireless sensing system with the damper 200. The wireless sensing system is integrated with the damper 200 such that one or more fluid properties in any one of the chambers in the damper 200 can be measured. The output of the wireless sensing system can then be used to assess the health of the damper 200. Any of the wireless sensing systems described above with reference to FIGS. 1A-1D may be integrated with the damper 200. In one embodiment, instrumentation of the damper 200 includes integrating a wireless sensing system 260 (in FIG. 2C) with the charging valve 245 in the port 242. In one embodiment, the wireless sensing system 260 is provided in a single device body that is integrated with the charging valve 245. In an alternate embodiment, at least the sensing part of the wireless sensing system 260 is integrated with the charging valve 245, and some or all of the remaining components of the wireless sensing system are integrated with other parts of the damper 200. The sensing part of the wireless sensing system 260 can be used to measure one or more fluid properties in the fluid chamber 239 adjacent to the charging valve 245. Preferably, the sensing part of the wireless sensing system 260 can measure at least the pressure, and optionally the temperature, within the fluid chamber 239. The measurements can be made periodically or continuously. A reader may be used to collect the data as already explained above. As illustrated in FIGS. 2B and 2C, wireless sensing system 260 is integrated with outer damper body 212, or first fluid device body 212. Wireless sensing system 260 including at least one fluid property sensor 105 integrated with and in sensing proximity to the fluid chamber and a communications device for wirelessly conveying a measurement made by the fluid property sensor 105 to a remote location. The communications device may be antenna 118 or transceiver 136, 136c. Preferably, the communications device uses a low-power wireless communications protocol, such as one a wireless communications protocol based on an IEEE standard selected from the group consisting of IEEE 802.15.1, IEEE 802.15.4, and IEEE 1902.1.

Wireless sensing system(s) may be located elsewhere in the damper 200 besides the charging valve 245. For example, a wireless sensing system 262 may be mounted in a port in the outer damper body 212 to measure one or more fluid properties in the working fluid chamber 246. Another wireless sensing system 264 may be mounted in a port in the outer damper body 212 to measure one or more fluid properties in the working fluid chamber 248. An appropriate seal should be provided at each of these ports to avoid fluid leakage from the damper 200. It is also possible to integrate a wireless sensing system 268 with the plug 255 in the port 241 to measure one or more fluid properties in the fluid chamber 240. Accordingly, charging valve 245 or plug 255 is mounted in port 241 in the second fluid device body 214, and the fluid property sensor 105 is integrated with the charging valve 245 or plug 255.

In this embodiment, fluid property sensor 105 is pressure sensor 108, 128.

The wireless sensing systems 260, 262, 264, 268 may use a battery and/or an energy harvester 162 for power. When energy harvester 162 is used, wireless sensing systems 260, 262, 264, 268 uses power storage device 164 for storing energy harvested.

The wireless sensing system 260, 262, 264, 268 includes microcontroller 112, 140 for controlling operation of the wireless sensing system 260, 262, 264, 268.

In one embodiment, at least one elastomer, such as elastomeric rings 230, 232, is mounted between and attached to an opposing surface of the first fluid device body and an opposing surface of the second fluid device body.

Figure 3A:
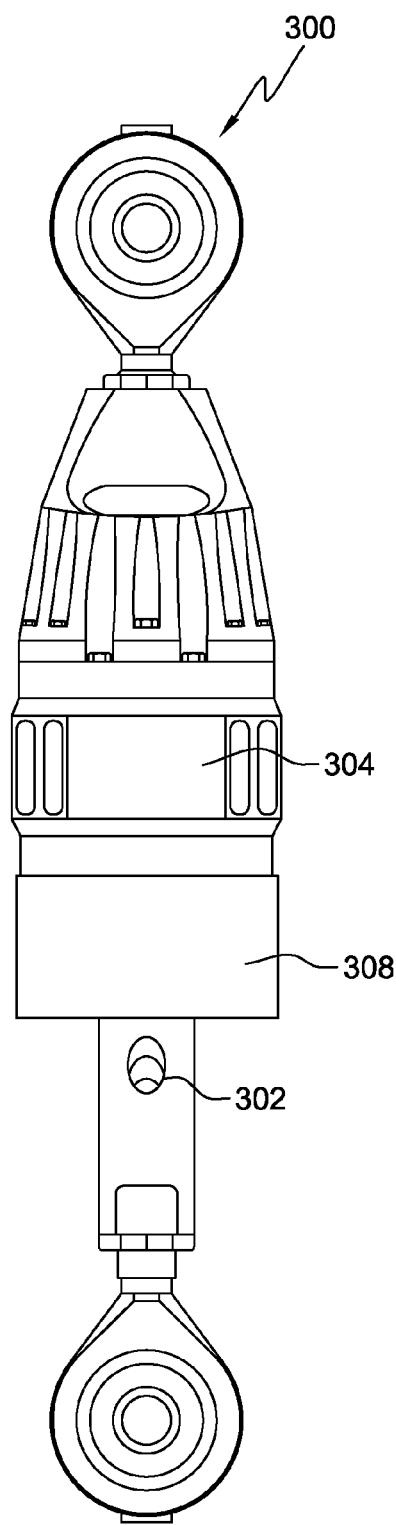
FIG. 3A illustrates a two-dimensional view of a damper including an active wireless sensing system powered by energy harvesting.

FIG. 3A shows an instrumented damper 300 (which may also be used as any one of the dampers 200a in FIG. 2A) in which the parts of the wireless sensing system are distributed, i.e., not all housed within a single device body. In this embodiment, only the sensing part of the wireless sensing system is integrated with a charging valve 302. The controller part and telemetry part of the wireless sensing system are located in a device body 308 that is mounted on the body of the damper 300. An energy harvester 304 for powering the wireless sensing system is also mounted on the body of the damper 300. A power storage device, as described above, may also be located in the device body 308.

Figure 3B:
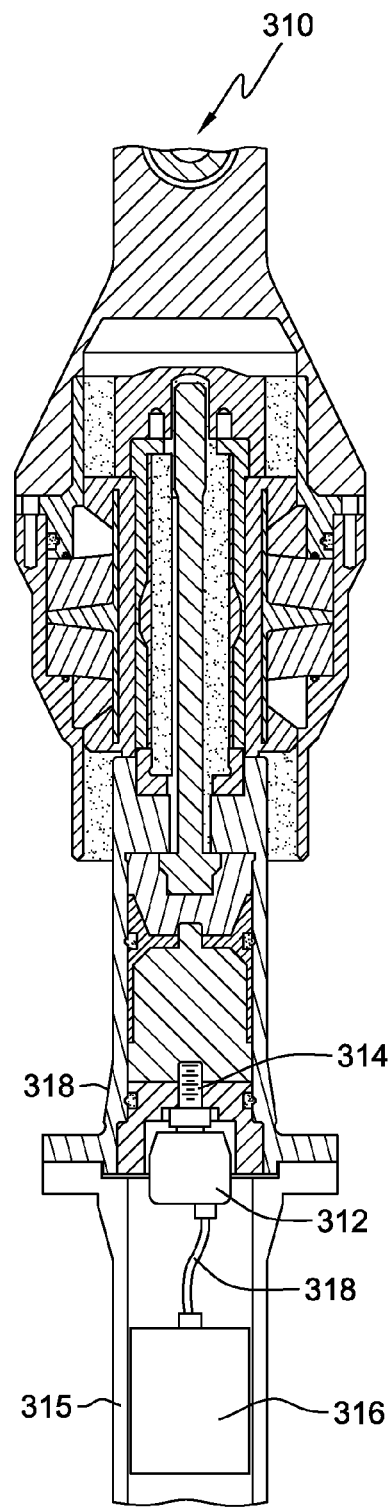
FIG. 3B illustrates a cross-section of an instrumented damper including a wireless sensing system powered by energy harvesting.
Figure 3C:
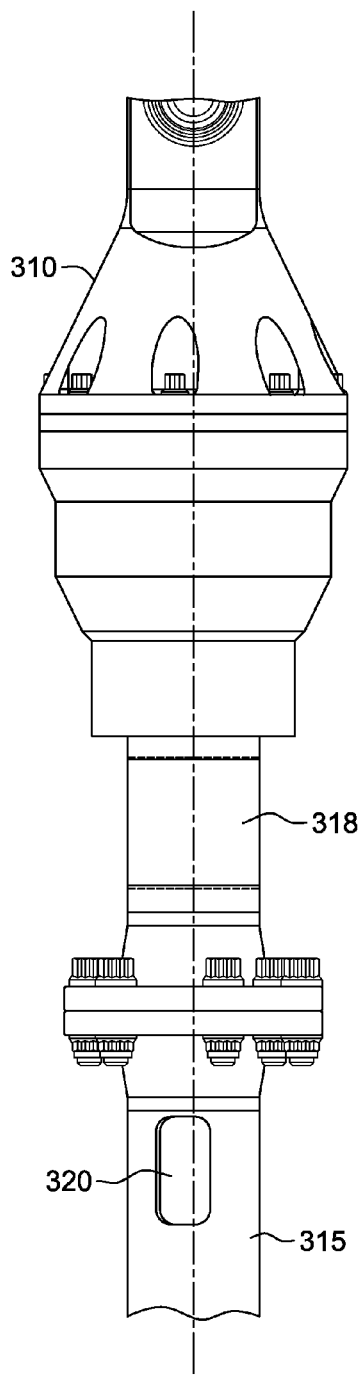
FIG. 3C illustrates a two-dimensional view of an instrumented damper including an active wireless sensing system powered by energy harvesting.

FIG. 3B shows another example of a damper 310 (which may also be used as any one of the dampers 200a in FIG. 2A) in which the parts of the wireless sensing system are distributed, i.e., not all housed within a single device body. In this embodiment, the sensing part, controller part, and telemetry part of the wireless sensing system are integrated into a stem cap 312 of a charge valve 314 mounted at an end of an inner damper body 318. A housing 315 containing an energy harvester 316 is coupled to the end of the inner damper body 318. The energy harvester 316 is connected to the wireless sensing system components inside the stem cap 312 by a cable 318. The housing 315 may include a window 320 (in FIG. 3C) to facilitate wireless communication with the wireless sensing system inside the stem cap 312. The dampers 300, 310 may each have a structure similar to the one described above. Alternatively, the dampers 300, 310 may have a different structure, i.e., one that does not include a spring connection for lead-lag damping.

Figure 4:
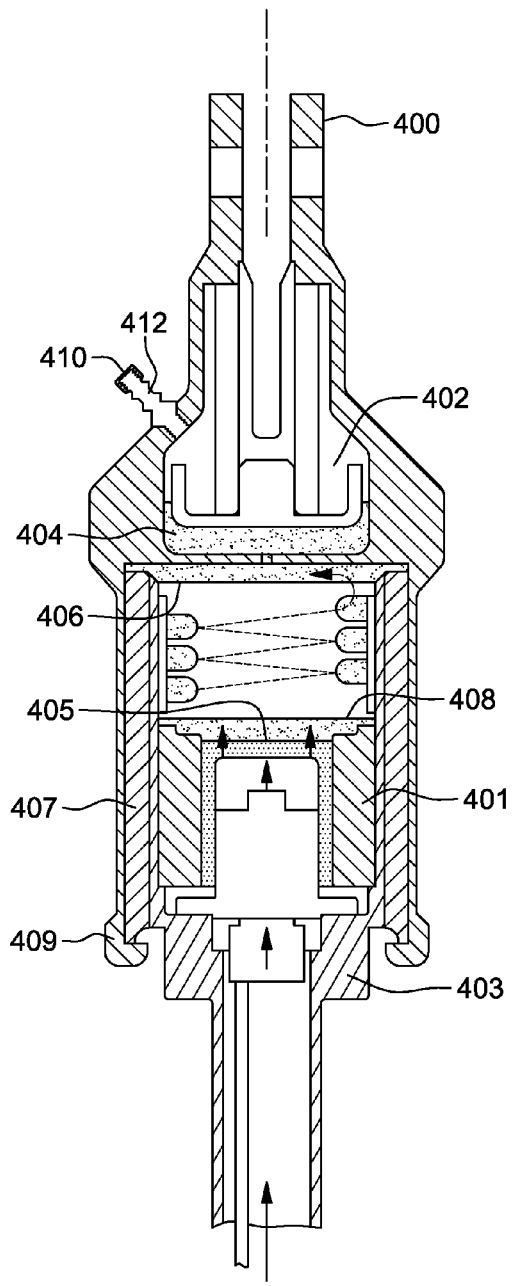
FIG. 4 illustrates an instrumented fluid strut isolator incorporating a wireless sensing system.

The wireless sensing system described with reference to FIGS. 1A-1D can also be used in other motion control fluid devices besides dampers. For example, FIG. 4 shows a support strut isolator 400 in which a wireless sensing system could be used. For the purpose of this invention, the support strut isolator includes chambers 402, 404, 406, 408, any of which could be monitored via a wireless sensing system as described above. The support strut isolator 400 includes a tubular elastomer 401 bonded to a support strut isolator inner member 403 and an actuator plunger 405. Another tubular elastomer 407 is bonded to a support strut isolator outer member 409 and support strut isolator inner member 403. The support strut isolator inner body 403 is movable relative to the support strut isolator outer member 409. In one example, a wireless sensing system (or at least the sensing part of the wireless sensing system) 410 is integrated with a charge valve 412 adjacent to the chamber 402.

Figure 5:
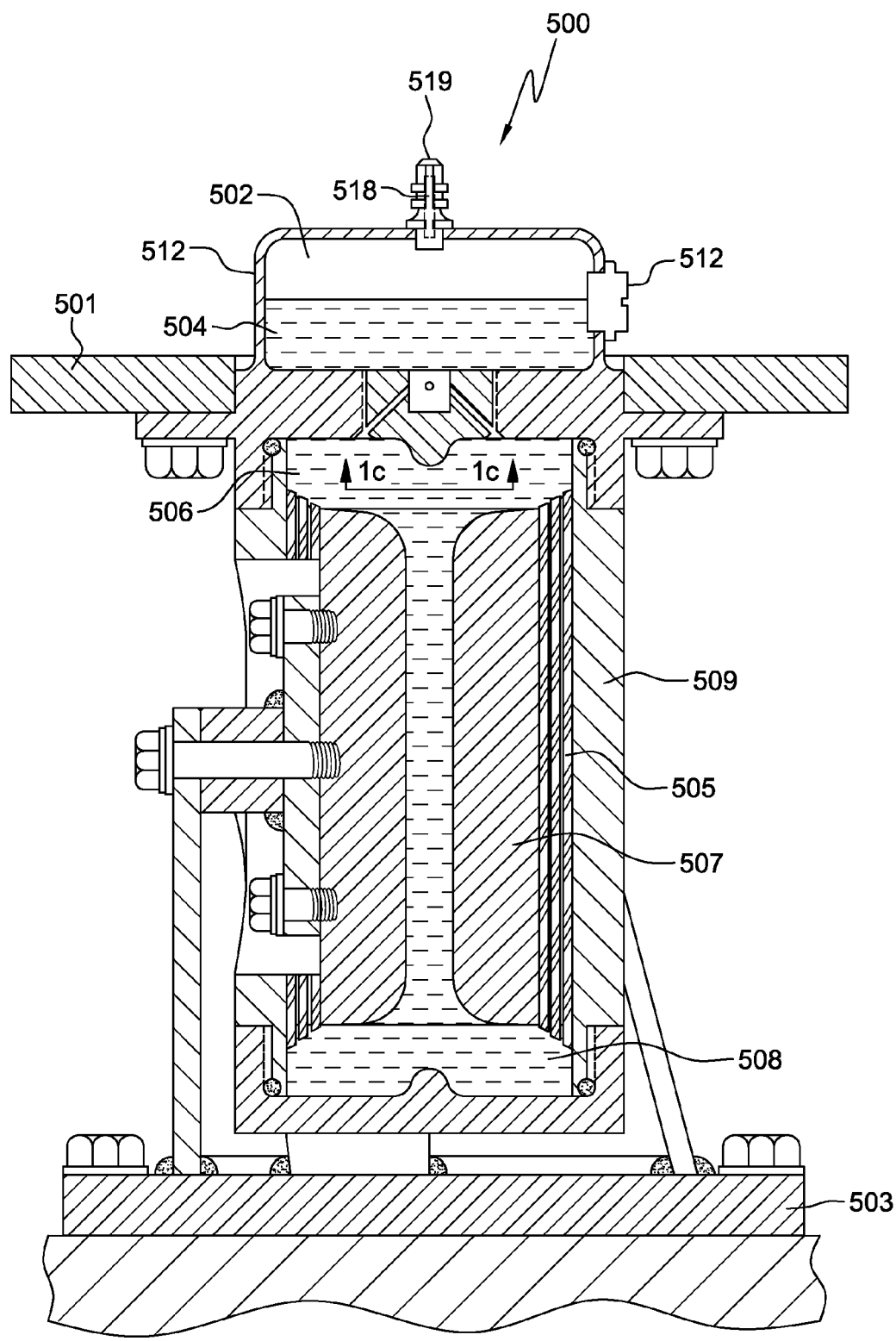
FIG. 5 illustrates an instrumented fluid mount incorporating a wireless sensing system.

In another example, FIG. 5 shows a fluid mount 500 in which a wireless sensing system could be used. The fluid mount 500 is attached to structures 501, 503. For the purpose of this invention, the fluid mount 500 includes fluid chambers 502, 504, 506, 508, any of which could be monitored via a wireless sensing system as described above. The fluid mount 500 also includes elastomer tubes 505 attached between opposing surfaces of inner and outer fluid mount bodies 507, 509. The inner fluid mount body 507 is movable relative to the outer fluid mount body 509. In one example, a wireless sensing system (or at least the sensing part of the wireless sensing system) 512 is mounted in a port in the volume compensator 514 of the fluid mount 500. Normally, this port would contain a sight glass to monitor the level of liquid in the volume compensator 514. In another example, a wireless sensing system 518 may be integrated with the charging valve 519. In another example, a wireless sensing system may be integrated with the outer fluid mount body 509, e.g., adjacent to either of the chambers 506, 508. An energy harvester may be mounted on either of the motion control fluid devices shown in FIGS. 4 and 5 to power the integrated wireless sensing devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A fluid device providing aircraft rotary wing motion control and controlling the relative motion between a first aircraft rotary wing member and a second aircraft is provided, the fluid device comprises:
   a first fluid device body;
   a second fluid device body movably coupled to the first fluid device body, wherein the first fluid device body and the second fluid device body each have an opposing surface therebetween;
   at least one fluid chamber inside one of the first and second fluid device bodies;
   at least one elastomer bonded between the opposing surfaces of the first and second fluid device bodies; and
   a wireless sensing system integrated with at least one of the first and second fluid device bodies, the wireless sensing system including at least one fluid property sensor in sensing proximity to the fluid chamber and a communications device for wirelessly conveying a measurement made by the fluid property sensor to a remote location.

2. The fluid device of claim 1, wherein the fluid property sensor is a pressure sensor.

3. The fluid device of claim 2, wherein the wireless sensing system further comprises a battery for powering the wireless sensing system.

4. The fluid device of claim 2, wherein the wireless sensing system further comprises an energy harvester for powering the wireless sensing system.

5. The fluid device of claim 4, wherein the wireless sensing system further comprises a power storage device for storing energy harvested by the energy harvester.

6. The fluid device of claim 2, wherein the wireless sensing system further comprises a microcontroller for controlling operation of the wireless sensing system.

7. The fluid device of claim 1, further comprising a valve or plug mounted in a port in the second motion control fluid device body, and wherein the fluid property sensor is integrated with the valve or plug.

8. The fluid device of claim 1, wherein the communications device is an antenna.

9. The fluid device of claim 1, wherein the communications device is a transceiver.

10. The fluid device of claim 1, wherein the communications device uses a low-power wireless communications protocol.

11. The fluid device of claim 1, wherein the communications devices uses a wireless communications protocol based on an IEEE standard selected from the group consisting of IEEE 802.15.1, IEEE 802.15.4, and IEEE 1902.1.

12. An instrumented motion control fluid device for providing a controlled relative motion between two structures, the instrumented motion control fluid device comprising:
   a first fluid device body;
   a second fluid device body movably coupled to the first fluid device body;
   at least one fluid chamber defined inside one of the first fluid device body and the second fluid device body; and
   a wireless sensing system integrated with at least one of the first fluid device body and the second fluid device body, the wireless sensing system including at least one fluid property sensor in sensing proximity to the fluid chamber and a communications device for wirelessly conveying a measurement made by the fluid property sensor to a remote location.

13. The instrumented motion control fluid device of claim 12, wherein the fluid property sensor is a pressure sensor.

14. The instrumented motion control fluid device of claim 13, wherein the wireless sensing system further comprises a battery for powering the wireless sensing system.

15. The instrumented motion control fluid device of claim 13, wherein the wireless sensing system further comprises an energy harvester for powering the wireless sensing system.

16. The instrumented motion control fluid device of claim 15, wherein the wireless sensing system further comprises a power storage device for storing energy harvested by the energy harvester.

17. The instrumented motion control fluid device of claim 13, wherein the wireless sensing system further comprises a microcontroller for controlling operation of the wireless sensing system.

18. The instrumented motion control fluid device of claim 12, further comprising a valve or plug mounted in a port in the second fluid device body, and wherein the fluid property sensor is integrated with the valve or plug.

19. The instrumented motion control fluid device of claim 12, further comprising at least one elastomer mounted between and attached to an opposing surface of the first fluid device and an opposing surface of the second fluid device.

20. The instrumented motion control fluid device of claim 12, wherein the communications device is selected from an antenna and a transceiver.

21. The instrumented motion control fluid device of claim 12, wherein the communications device uses a low-power wireless communication protocol.

* * * * *